April 14, 1970 J. E. McCANSE 3,505,800
CUTTER ASSEMBLY FOR A FLAIL-TYPE MOWER
Filed May 4, 1967 4 Sheets-Sheet 2
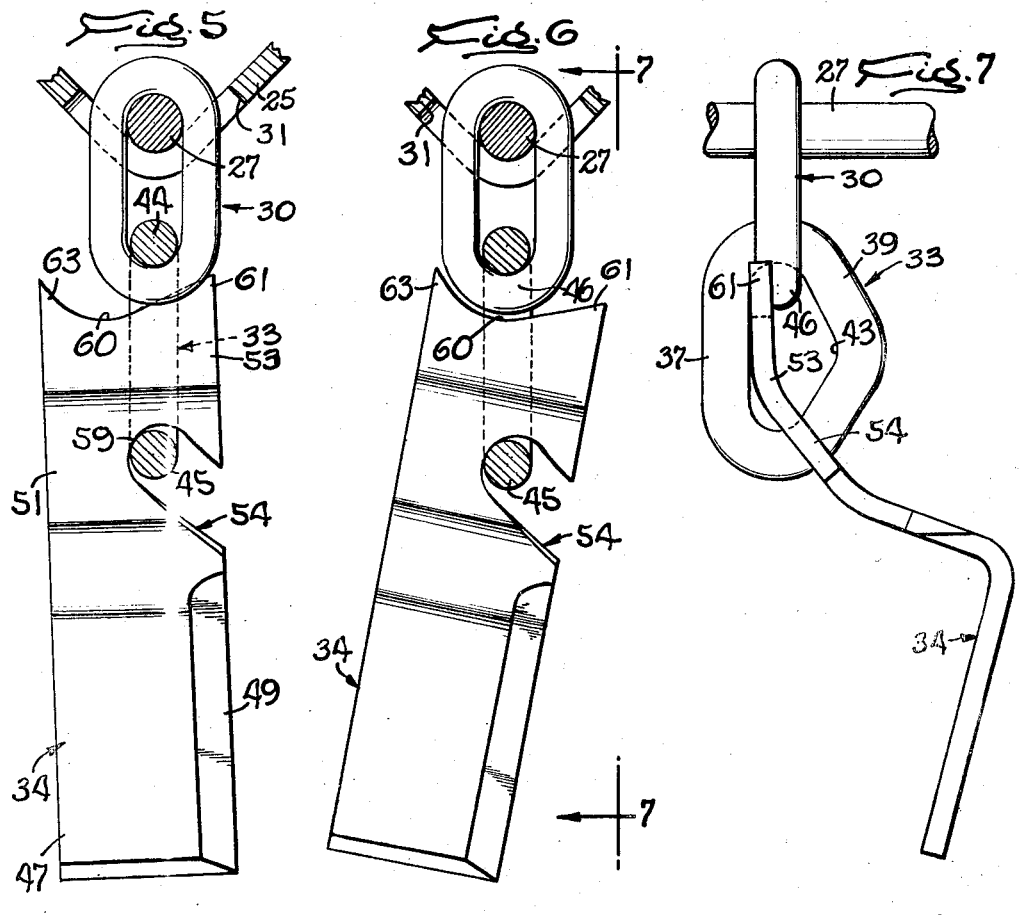
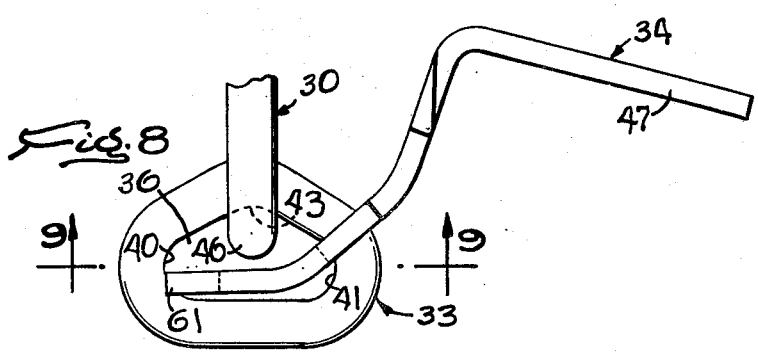
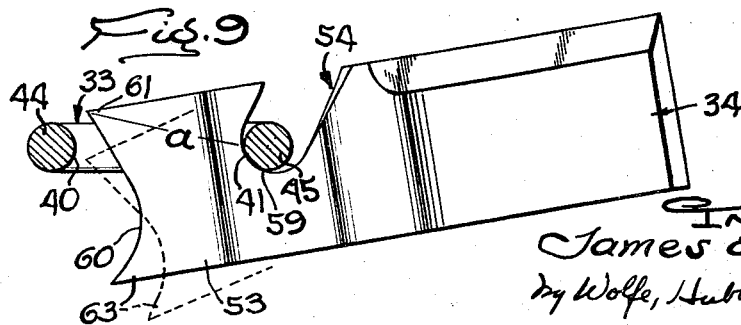
INVENTOR
James Edson McCanse
by Wolfe, Hubbard, Voit & Osann
ATTORNEY

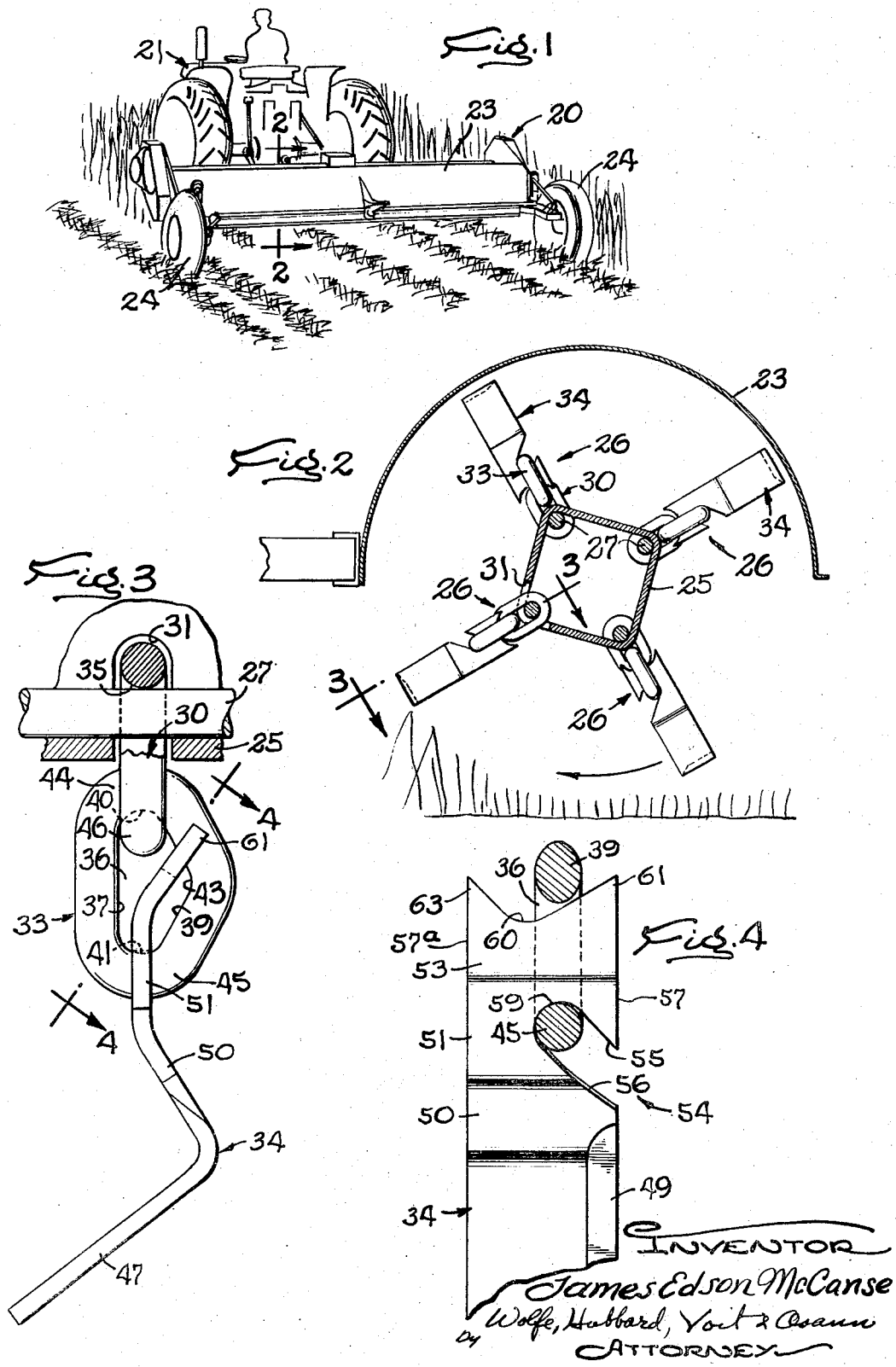

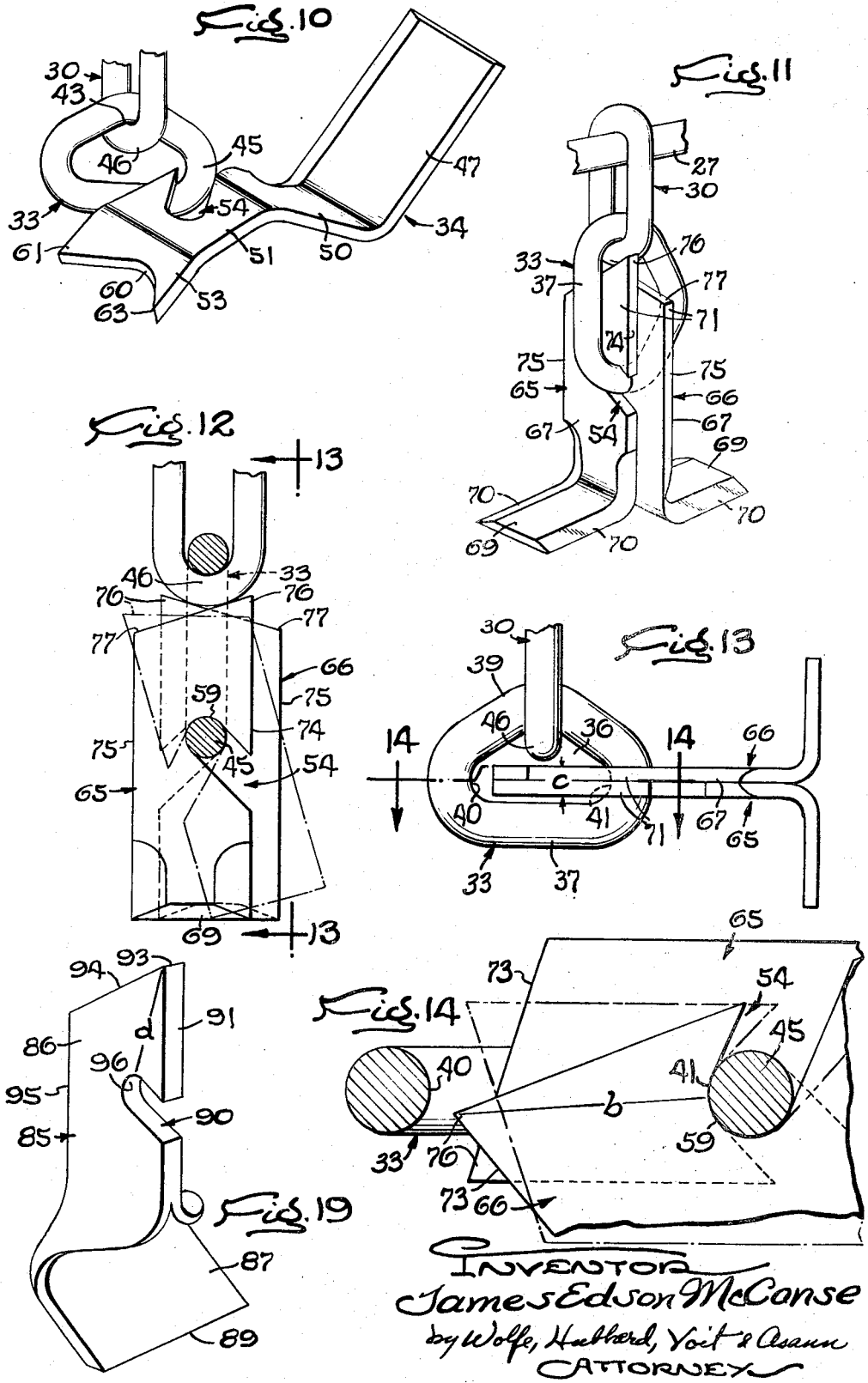

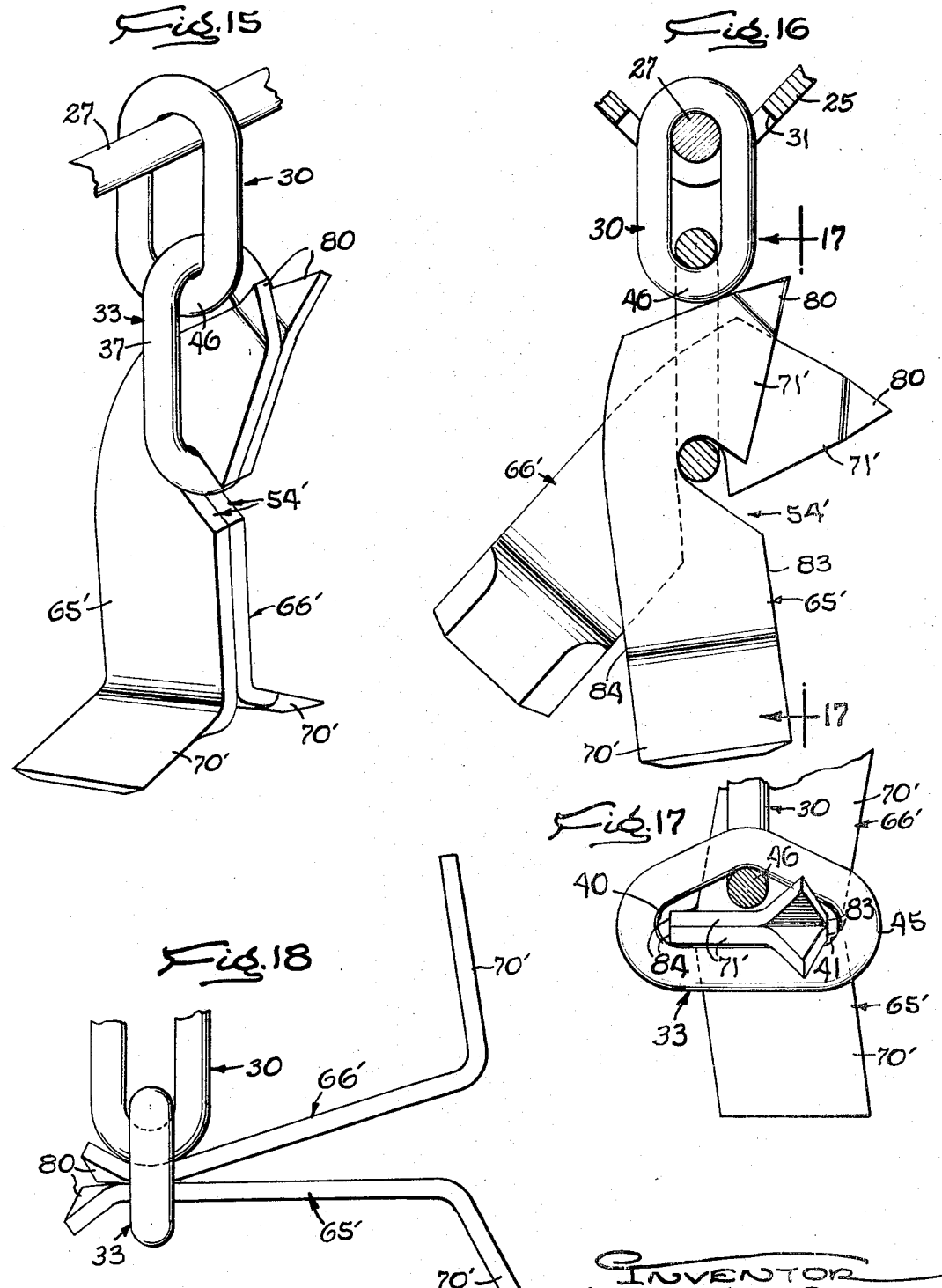

United States Patent Office 3,505,800
Patented Apr. 14, 1970

3,505,800
CUTTER ASSEMBLY FOR A FLAIL-TYPE MOWER
James Edson McCanse, Oregon, Ill., assignor, by mesne assignments, to Hesston of Delaware, Inc., Wilmington, Del., a corporation of Delaware
Filed May 4, 1967, Ser. No. 636,209
Int. Cl. A01d 55/20
U.S. Cl. 56—294     14 Claims

ABSTRACT OF THE DISCLOSURE

A cutter assembly for a flail-type mower and including an oval-shaped link pivotally suspended from the rotor of the mower, a D-shaped link interlinked chain fashion with the oval link, and a flail blade which is hooked pivotally onto the D-link and which simply may be unhooked from the D-link when it is necessary to remove the blade. The two links and the blade coact with each other to hold the blade securely attached to the rotor during normal service use of the mower in spite of the fact that the blade merely is hooked onto the D-link.

BACKGROUND OF THE INVENTION

This invention relates to a cutter assembly for a flail-type mower and, more particularly, to a cutter assembly of the type in which a flail blade is suspended pivotally from an attaching link fastened to a mounting element on the rotor of the mower.

It has been recognized for some time that flail mowers possess certain advantages over rotary mowers in the shredding and cutting of vegetation. One of the primary drawbacks, however, of most flail mowers which have enjoyed commercial acceptance resides in the difficulty encountered in removing the blades from the rotor for purposes of replacement and sharpening. Many blades are attached permanently to the attaching link thus requiring replacement of the entire cutter assembly if one of the parts should fail. Other types of blades are bolted or pinned to the attaching link thus making it necessary to remove and re-install a large number of fastening elements to change a set of blades. This, of course, is a difficult and time-consuming task, particularly since the fastening elements often are frozen in place due to damage or rust. Moreover, the fastening elements, often work loose or become broken and must be replaced quite frequently.

SUMMARY OF THE INVENTION

The primary aim of the present invention is to provide a simplified and inexpensive cutter assembly in which the blade may be fastened to and removed from the attaching link more quickly and easily than previously has been possible and yet still is held securely to the attaching link under all operating conditions of the mower. For these purposes, the invention contemplates a blade which simply may be hooked onto and unhooked from the attaching link and which coacts with the attaching link and with the mounting element in a novel manner preventing detachment of the blade unless the blade and the attaching link are moved intentionally through a predetermined sequence of diverse motions not normally occurring during operation of the mower.

The invention also resides in the formation of a novel hook in the blade and in the unique construction of the attaching link to enable fast, easy and yet secure attachment of the blade to the link without the use of separate fastening elements.

BRIEF DESCRIPTION OF THE DRAWINGS

FIGURE 1 is a perspective view of a tractor pulling a flail-type mower equipped with cutter assemblies embodying the novel features of the present invention.

FIG. 2 is an enlarged fragmentary cross-section taken substantially along the line 2—2 of FIG. 1.

FIG. 3 is an enlarged fragmentary cross-section taken substantially along the line 3—3 of FIG. 2.

FIG. 4 is a fragmentary cross-section taken substantially along the line 4—4 of FIG. 3.

FIG. 5 is a fragmentary elevation of the cutter assembly and the rotor with parts broken away and shown in section, the blade being illustrated in its normal installed position.

FIG. 6 is a view similar to FIG. 5 and showing the first step of unhooking the blade from the attaching link.

FIG. 7 is a fragmentary cross-section taken substantially along the line 7—7 of FIG. 6 and showing the second step of unhooking the blade.

FIG. 8 is a view similar to FIG. 7 and showing the third step of unhooking the blade.

FIG. 9 is a cross-section taken substantially along the line 9—9 of FIG. 8 and showing the final step of unhooking the blade.

FIG. 10 is a fragmentary perspective view of the cutter assembly and showing the initial step of re-hooking the blade onto the attaching link.

FIG. 11 is a perspective view of a modified cutter assembly which includes a pair of flail blades.

FIG. 12 is a side elevation of the modified cutter assembly and showing in phantom the first step of unhooking the blades, parts being broken away and shown in section.

FIG. 13 is a fragmentary cross-section taken substantially along the line 13—13 of FIG. 12 and showing the second step of unhooking the blades.

FIG. 14 is an enlarged fragmentary cross-section taken substantially along the line 14—14 in FIG. 13 and showing the final step of unhooking the blades.

FIG. 15 is a perspective view of a third form of the cutter assembly.

FIG. 16 is a side elevation of the third form of the cutter assembly and showing the first step of unhooking the blades, parts being broken away and shown in section.

FIG. 17 is a fragmentary cross-section taken substantially along the line 17—17 of FIG. 16 and showing the second step of unhooking the blades.

FIG. 18 is a fragmentary view similar to FIG. 16 and showing the final step of unhooking the blades.

FIG. 19 is a perspective view of a modified blade.

DETAILED DESCRIPTION

As shown in the drawings for purposes of illustration, the invention is embodied in a flail-type mower 20 adapted to be pulled in a field by a tractor 21 and operable to sever and shred vegetation growing in the field. Such mowers include a semi-cylindrical housing 23 supported at the front by the tractor and at the rear by a pair of ground-engaging wheels 24. Journaled in the housing for rotation about a horizontal axis in a forward or clockwise direction (FIG. 2) is a hollow rotor 25 power-driven by the P.T.O. shaft of the tractor and mounting a plurality of cutter assemblies 26 which cut the growing vegetation with a flailing action.

Herein, the rotor 25 is of rectangular cross-section and receives four laterally extending and angularly spaced rods 27 (FIGS 2 and 3) which are mounted in the corners of the rotor. Each cutter assembly 26 includes a mounting element 30 pivotally connected to one of the rods and projecting outwardly to the outside of the rotor through an opening 31 formed in the rotor adjacent the rod. At its lower end, each mounting element pivotally supports an attaching link 33 which, in turn, serves to fasten a relatively metal flail blade 34 to the rotor. The blades are swung radially outwardly by the centrifugal force developed by rotation of the rotor and, should an obstruction be encoutered, the blades simply swing inwardly and pass over the obstruction.

The present invention contemplates a simplified cutter assembly 26 in which the blade 34 may be attached to and detached from the attaching link 33 much quicker and easier than in prior assemblies of the same general type and yet still is held securely to the link during service use of the mower 20. To these ends, the blade simply is hooked onto the attaching link 33 without the aid of separate fasteners and coats in a novel manner with the link and the mounting element 30 so as to be held securely to the link until intentionally removed. After the blade and the link have been shifted through a predetermined sequence of motions which are not common to the natural motions undertaken by these members during operation of the mower, the blade may be unhooked from and slipped off of the attaching link for purposes of sharpening or replacement.

In the present instance, the mounting element 30 and the attaching link 33 of the novel blade assembly 26 each comprise endless chain-type links made of steel and interlinked chain fashion as shown most clearly in FIGS. 3 and 10. The upper or mounting link 30 is of oval configuration (see FIGS. 5 and 6) and is formed with a laterally facing ovel-shaped opening 35 through which one of the hinge rods extends to suspend the link pivotally from the rotor 25.

The attaching link 33 is formed with a central opening 36 (FIG. 3) which defines a closed loop having a straight upright side 37 and having an opposing outwardly bulged side 39 which is greater in length than the straight side when the two sides are measured between points 40 and 41 (FIG. 3) located at the upper and lower ends of the opening 36. Because of the outwardly bulged side 39, the attaching link 33 and the opening 36 therein are generally D-shaped in elevation, and a pocket 43 defining the maximum transverse dimension of the opening 36 is formed midway between the upper and lower ends 44 and 45 of the attaching link. For purposes of conciseness and clarity, the upper mounting link 30 and the lower attaching link 33 hereafter will be referred to as the oval link and the D-link, respectively.

With the two links 30 and 33 interlinked chain fashion, the lower end portion 46 of the oval link 30 extends through and occupies part of the upper end of the opening 36 in the D-link while the upper end 44 of the D-link extends through the lower end of the opening 35 in the oval link. The D-link thus is suspended pivotally from the oval link and normally hangs in the position shown in FIG. 3 with the pocket 43 facing laterally.

In the first embodiment of the invention, the blade 34 is of the so-called side sliced type. The blade comprises a cutting section 47 (FIG. 3) inclined at angle of approximately 45 degrees to the vertical and sharpened at its leading edge as indicated at 49 (FIG. 5). Disposed above and angularly offset from the cutting section is an attaching section which includes a lower portion 50 (see FIGS. 3, 4 and 10) bent at a right angle to the cutting section 47, an intermediate portion 51 disposed in an upright plane, and an upper end portion 53 inclined in approximately the same plane as the cutting section 47 but extending in an opposite direction from the lower and intermediate portions 50 and 51.

As shown most clearly in FIGS. 4 and 5, an upwardly inclined and downwardly opening notch 54 is formed in the upright portion 51 of the blade and defines a hook by which the blade 34 may be attached to the D-link 33.

The notched hook is defined by a pair of upper and lower spaced walls 55 and 56 inclined upwardly from the forward edge 57 of the blade toward the upper end of the blade and gradually merging with each other so that the hook is formed with an arcuate closed end 59. The two walls are spaced apart from each other a distance slightly greater than the cross-sectional diameter of the metal forming the D-link to permit the lower end 45 of the D-link to pass into the hook. In the normal installed position of the blade (see FIGS. 3 to 5), the hook 54 hangs pivotally on the lower end 45 of the D-link, and the upper portion 53 of the blade is located within the opening 36 in the D-link. The blade thus hangs generally vertically from the D-link as shown in FIG. 5.

Generally stated, it is necessary, in order to unhook the blade 34 from the D-link 33, to tilt the blade counterclockwise (FIG. 4) about the pivot established by the closed end 59 of the hook 54 and the lower end 45 of the D-link and to tilt the upper portion 53 of the blade counterclockwise through the opening 36 in the D-link. With the blade thus tilted, the hook 54 may be slid downwardly from the lower end of the D-link to release the blade as shown in FIG. 9. During normal operation of the mower 20, however, the D-link 33 and the oval link 30 coact with each other and with the blade to prevent such tilting and to prevent the blade from being unhooked from the D-link until the latter is moved from its normal positions (FIGS. 3 and 7) to a release position (FIG. 8) in which the D-link is turned through an angle of 90 degrees and in which the pocket 43 is facing downwardly. Before the D-link can be turned to its release position, however, the blade must be shifted from its normal installed position (FIG. 5) to an intermediate position (FIG. 7) permitting turning of the D-link. Thus, to unhook the blade, the blade first is moved from its normal installed position to its intermediate position to permit turning of the D-link, the D-link then is turned to its release position to permit tilting of the blade and finally, the upper portion 53 of the blade is tilted through the D-link to permit release of the hook from the D-link.

Herein, the upper end of the blade 34 is designed in a manner that pervents unhooking of the blade unless the foregoing procedure is followed. The extreme upper edge of the blade is curved downwardly from the forward edge 57 of the blade to a point just beyond the center axis of the blade and then is curved upwardly from such a point to the rear edge 57a of the blade thereby to define an upwardly opening curved recess 60 (see FIGS. 4 and 5) in the upper end of the blade. A forward inverted V-shaped point 61 and a rear inverted V-shaped point 63 thus are formed at the upper end of the blade on opposite sides of the recess 60.

When installed, the blade 34 hangs in a balanced position on the D-line 33 and, because the upper blade portion 53 is bent angularly relative to the upright portion 51, the extreme upper edge of the blade is tilted outwardly against the outwardly bulged side 39 of the D-link (see FIG. 3). As shown most clearly in FIGS. 3 and 4, the outwardly bulged side 39 is cradled within the upper recess 60 and is disposed between the forward and rear points 61 an 63. Normal centrifugal force developed during rotation of the blade causes the blade to swing counterclockwise (FIG. 4) about the lower end 45 of the D-link. The forward point 61 thus swings into engagement with that portion of the outwardly bulged side 39 disposed above the pocket 43 and prevents the upper portion 53 of the blade from tilting counterclockwise through the opening 36 in the D-line. As a result, the blade cannot become unhooked from the D-link.

If the blade 34 is swung clockwise (FIG. 4) about the lower end 45 of the D-link 33 as a result of the cutting edge 49 striking an obstruction, the rear point 63 will swing into engagement with the rear surface of the outwardly bulged side 39 of the D-link to prevent the blade from being turned to a position permitting unhooking of the blade from the D-link. Moreover, should the blade be bumped upwardly from its bottom and tend to raise upwardly in the D-link, the edge of the recess 60 will engage either the inner surface of the outwardly bulged side 39 or the lower end 46 of the oval link 30 to prevent the blade from moving upwardly sufficiently far to permit release of the hook 54 from the lower end 45 of the D-link. Accordingly, as long as the blade and the D-link remain positioned with the outwardly bulged side 39 cradled within the recess 60, the blade cannot be unhooked from the D-link.

To unhook the blade 34, the blade must be shifted from its normal position (FIG. 5) to its intermediate position (FIG. 7) to permit the D-link 33 to be turned in the oval link 30 to its release position (FIG. 8). Normally, the blade hangs as shown in FIGS. 3 and 5 with the forward point 61 disposed between the outwardly bulged side 39 and the lower end 46 of the oval link. If an unusual force acting on the blade tends to turn the D-link toward its release position, the forward point 61 engages the lower end 46 of the oval link and locks D-link against turning. When, however, the blade intentionally is tilted clockwise through a short arc about the lower end 45 of the D-link to the position shown in FIG. 6, the recess 60 in the upper end of the blade becomes alined with the lower end 46 of the oval link and, at the same time, the forward point 61 is shifted clear of the oval link. As a result, the blade may be tipped about a fore-and-aft axis from the normal position (FIG. 3) to the intermediate position (FIG. 7) to cause the upper portion 53 of the blade to pass beneath the oval link and to stop against the straight side 37 of the D-link. The hook 54 slides a short distance upwardly along the outwardly bulged side 39 of the D-link as the blade is tipped.

With the upper portion 53 of the blade 34 disposed between the oval link 30 and the straight side 37 of the D-link 33, it still is impossible to unhook the blade since the forward and rear points 61 and 63 will engage the lower end 46 of the oval link to prevent the blade from being titled through any substantial arc about the lower end 45 of the D-link. The blade, however, no longer locks the D-link against turning, and thus the D-link may be turned 90 degrees in the oval link to the release position shown in FIG. 8. The blade is carried along with the D-link during such turning and is shifted from a generally vertical position to a generally horizontal position.

As shown in FIG. 8, the lower end 46 of the oval link 30 no longer is disposed within the upper portion of the opening 36 in the D-link 33 when the latter link is in its release position. That is, the effective length of the opening 36 no longer is decreased by the presence of the oval link, and is equal to the full distance between the points 40 and 41 at the upper and lower ends of the opening. This distance is greater than the distance a (FIG. 9) between the closed end 59 of the hook and the forward point 61, and thus the forward point can pass through the opening 36 (see FIG. 9) when the blade is tilted counterclockwise about the lower end 45 of the D-link. When the blade is tilted, the upper portion 53 of the blade is clear of the upper end 44 of the D-link thereby permitting removal of the blade simply by releasing the hook 54 from the lower end of the D-link.

From the foregoing, it will be apparent that the lower end 46 of the oval link 30 normally fills the upper end of the opening 36 in the D-link 33 and prevents the blade 34 from becoming unhooked. Only when the lower end 46 of the oval link in effect is moved out of the upper end of opening 36 and along the outwardly bulged side 39 into the pocket 43 can the forward point 61 be tilted counterclockwise through the opening 36 to permit unhooking of the blade. The blade, however, normally prevents the D-link from being turned to a position in which the lower end 46 of the oval link is disposed in the pocket 43. Thus, three intentional motions are necessary to unhook the blade. The blade must be tipped to permit turning of the D-link to the release position, the D-link must be turned to such position, and the blade must be tilted and unhooked. With this arrangement, it is virtually impossible for the blade to become unhooked during normal service use and yet the blade may be removed quite easily for purposes of sharpening or replacement.

To re-hook the blade 34, it is necessary only to turn the D-link 33 to the release position as shown in FIG. 10. With the blade held in a generally horizontal position, the hook 54 simply is slipped over the lower end 45 of the D-link and the forward point 61 is rotated through the opening 36 in the D-link. When the blade is released and allowed to drop from its horizontal position, it will swing to its vertical installed position and will turn the D-link automatically to the normal position shown in FIG. 3.

A modified cutter assembly is shown in FIGS. 11 to 14 in which parts corresponding to those of the first modification are indicated by the same reference numerals. In this instance, the oval link 30 and the D-link 33 are the same as before, but a pair of identical so-called reversible-L blades 65 and 66 are hooked onto the D-link instead of a single side slicer blade. Each blade 65, 66 is formed with an upright attaching section 67 and with a lower cutting section 69 bent at a right angle to the attaching section and sharpened at its leading and trailing edges as indicated at 70. The notched hook 54 is formed in the attaching section about midway between the upper and lower ends thereof.

As shown in FIG. 11, the blades 65 and 66 are hooked onto the D-link 33 with the notched hook 54 in the blade 65 facing forwardly and with the hook in the blade 65 facing rearwardly. When installed, the blades hang vertically with the upper portions 71 of the blades disposed within the opening 36 in the D-link. To prevent the blades from becoming unhooked, the upper edge 73 of each blade is inclined downwardly from the notched vertical edge 74 of the blade toward the opposite vertical edge 75 so that each blade is formed with an upper point 76 and a lower point 77. The distance $b$ (FIG. 14) between each upper point 76 and the pivot defined by the closed end 59 of the hook 54 and the lower end 45 of the D-link is less than the distance between the upper and lower ends 40 and 41 of the opening 36 in the D-link but is greater than the distance between the lower end 46 of the oval link 30 and the lower end 41 of the opening 36. Thus, when the D-link is in its normal position and when either blade is tilted about the lower end 45 of the D-link from its normal installed position (FIGS. 11 and 12) and in a direction tending to turn the upper point 76 through the opening 36 in the D-link, the upper point will engage the lower end 46 of the oval link 30 to prevent the upper portion 71 of the blade from tilting through the opening 36 and to a position permitting unhooking of the blade. The distance between the closed end 59 of the hook 54 and each lower point 77 is less than the distance between the lower end 46 of the oval link 30 and the lower end 41 of the opening 36 so that the upper portion 71 of either blade can be moved through the opening 36 when the blade is tilted in a direction turning the lower point 77 toward the oval link. Unhooking of the blades still is prevented, however, by making the width of the blades, that is, the distance between the edges 74 and 75, greater than the distance between the lower end 46 of the oval link and the lower end 41 of the opening 36 in the D-link. Thus, if either blade should happen to be tilted in a direction moving the lower point 77 through the opening 36 when the D-link is in its normal position, the edge 75 of the blade will engage the lower end 46 of the oval link when the blade is raised upwardly and will prevent the hook 54 from moving upwardly off of the lower end 45 of the D-link. Accordingly, as long as the D-link is in its normal position, neither blade can be unhooked regardless of which direction the blade is tilted.

Furthermore, the D-link 33 is locked against movement to its release position shown in FIG. 13 as long as the blades 65 and 66 are hanging normally. Herein, such locking of the D-link is achieved by making the combined thickness c (FIG. 13) of the two blades sufficiently great so that, when the blades are hanging normally with the blade 65 disposed against the straight side 37 of the D-link, the distance within the opening 36 between the upper edge 73 of the blade 66 and the outwardly bulged side 39 is smaller than the cross-sectional diameter of the metal forming the oval link 30. Thus, if an abnormal force should tend to turn the D-link counterclockwise from the normal position shown in FIG. 11 toward the release position shown in FIG. 13, the lower end 46 of the oval link will become wedged between the upper edge 73 of the blade 66 and the outwardly bulged side 39 of the D-link thereby to prevent turning of the D-link. As a result, the D-link cannot be turned to its release position as long as the blades are hanging in normal fashion.

To unhook the blades 65 and 66, it first is necessary to tilt the blade 66 counterclockwise through a short arc about the lower end 45 of the D-link 33 to an intermediate position shown in phantom in FIG. 12 with the lower point 77 moved through the opening 36 in the D-link. When the blade 66 is in this position, the upper edge 73 no longer partially closes the upper end of the opening 36 and, in effect, the distance within the opening 36 between the upper edge 73 and the outwardly bulged side 39 is increased. As a result, the D-link may be turned to the release position (FIG. 13) without the lower end 46 of the oval link 30 wedging between the upper edge 73 of the blade 66 and the outwardly bulged side 39 of the D-link. The blades turn with the D-link and move to generally horizontal positions. Once the D-link is in its release position, the blade 66 may be unhooked from the D-link simply by tilting this blade counterclockwise about the lower end 45 of the D-link thereby to move the upper point 76 of the blade 66 through the opening 36 in the D-link as shown in FIG. 14. The upper point 76, of course, will pass through the opening 36 when the D-link is in its release position because the distance $b$ between the upper point 76 and the closed end 59 of the hook 54 is less than the distance between the upper and lower ends 40 and 41 of the opening 36 in the D-link. After the blade 66 has been unhooked, the blade 65 may be unhooked by tilting it clockwise (FIG. 14) and moving the upper point 76 through the opening in the D-link in a manner similar to the blade 66.

It will be seen that the same principle is involved in the modified cutter assembly as in the first cutter assembly. That is, the blades 65 and 66 can be unhooked only when the D-link 33 is in its release position, and the D-link can be moved to its release position only after at least one of the blades is shifted from its normal position to an intermediate position. In the modified cutter assembly, the thickness of the blades is relied upon to prevent the D-link from moving to its release position as long as the blades are hanging normally. The blades may be re-hooked to the D-link simply by reversing the steps followed in unhooking the blades.

Still another modified cutter assembly utilizing different blades is shown in FIGS. 15 to 18 in which the parts of the blades corresponding to those of the immediately preceding cutter assembly are indicated by the same but primed reference numerals. Herein, a pair of blades 65' and 66' are hooked on to the D-link 33 with the notched hook 54' in each blade facing forwardly. As shown in FIG. 15, the upper forward corners of the blades are turned outwardly to form wings 80 which extend outwardly beyond the forward surfaces of the sides 37 and 39 of the D-link. This arrangement insures that the blades will not lock the oval link 30 to the D-link when the blades are swung forwardly or counterclockwise during normal rotation of the rotor 25. Instead, the wings engage the lower end 46 of the oval link and allow the D-link to swing or oscillate freely relative to the oval link. As a result, the two links will swing relative to one another rather than for all of the oscillation to occur between the oval link and the hinge rod 27.

In this modification also, the combined thickness of the blades 65' and 66' prevents the D-link 33 from being turned to its release position (FIG. 17) until the blade 66' is tilted, herein in a clockwise direction, to an intermediate position (FIG. 16) to increase the effective width of the upper end of the opening 36 in the D-link. As before, the blades are moved to generally horizontal positions when the D-link is turned to its release position (FIG. 17). Even with the D-link in its release position, however, the wings 80 will engage the sides 37 and 39 of the D-link to prevent the blades from being unhooked simply by tilting the upper portions 71' counterclockwise through the opening 36. Instead, after the D-link has been moved to its release position so that the lower end 46 of the oval link 30 no longer is disposed in the upper end of the opening 36, each blade must be shifted toward the upper end of the opening as shown in FIG. 17 to release the hook 54' from the lower end 45 of the D-link. Then, the blades may be removed from the D-link by pulling the blades, one at a time, endwise through the opening 36 in the D-link (see FIG. 18), it being necessary to turn the blades slightly to allow the wings 80 to pass through the opening.

Such removal of the blades 65' and 66' is possible because the distance between the forward and rear edges 83 and 84 of each blade, while being greater than the distance between the lower end 41 of the opening 36 and the lower end 46 of the oval link 30 when the latter is disposed in the upper end of the opening, is somewhat less than the distance between the upper and lower ends 40 and 41 of the opening. With this arrangement, the rear edge 84 will engage the lower end 46 of the oval link and prevent the hook 54' from lifting off of the D-link when the D-link is in its normal position and yet the blade can be unhooked and removed endwise through the opening 36 in the D-link 33 when the latter link is in its release position with the lower end 46 of the oval link disposed in the pocket 43.

Another blade 85 embodying the features of the present invention is shown in FIG. 19 and includes an upright attaching section 86 integral with and upstanding from a cup-type cutting section 87 which is sharpened along its lower edge as indicated at 89. A notched hook 90 is formed in the forward edge 91 of the attaching section and is spaced below an upper point 93 formed by inclining the upper edge 94 of the blade downwardly from the forward edge to the rear edge 95. Herein, the distance $d$ between the point 93 and the closed end 96 of the hook is greater than the distance between the upper and lower ends 40 and 41 of the opening 36 in the D-link 33 so that the upper end of the blade cannot be tilted rearwardly through the opening even when the D-link is in its release position. Instead, it is necessary to lift the hook frame 90 from the lower end 45 of the D-link and remove the blade endwise through the opening 36 the same as with the blades 65' and 66'. The thickness of the attaching section 86 is about equal to the combined thickness of the blades 65' and 66' and is sufficiently great that the D-link cannot be moved to its release position unless the blade first has been tilted forwardly to move the upper edge 94 of the blade out of the upper end of the opening 36 in the D-link.

From the foregoing, it will be apparent that the blades of the cutter assemblies of the present invention may be attached to and detached from the rotor of the mower much quicker and easier than previously has been possible. Since the blades of each assembly cannot be unhooked until both the blade and the D-link have been moved through a series of diverse positions, each blade remains securely attached to the D-link during operation of the mower.

I claim as my invention:

1. In a cutter assembly for a flail-type mover having a power-driven rotor, said assembly comprising a mounting element adapted to be connected to the rotor, an opening formed through said mounting element between the upper and lower ends of the mounting element, a chain-type link extending through said opening and hanging pivotally from the lower end portion of said mounting element, said link defining a closed loop having a first side, and having an outwardly bulged second side opposing said first side, the lower end of said mounting element normally being disposed within the upper portion of said loop between the side of the loop, a blade comprising a metal member having a sharpened cutting section and having a genarally upright attaching section disposed above said cutting section, a notch formed in said attaching section and opening out of one edge of said attaching section, said notch being defined by a pair of spaced apart upper and lower walls inclined upwardly from said one edge toward the upper end of said attaching section and terminating in a closed end, an upper portion of said attaching section being disposed within said loop with the walls of said notch being hooked around the lower end of the link to hold said blade on said link, said upper portion of said attaching section normally being engageable with said mounting element to restrict relative movement of said mounting element along said outwardly bulged side of said link and to prevent detachment of said blade from said link, and said upper portion of said attaching section being movable to a position leaving said mounting element free for relative movement along said outwardly bulged side of said link and thereby leave said blade free for detachment from said link.

2. A cutter assembly as defined in claim 1 in which said outwardly bulged side of said loop defines an open-sided pocket, said pocket facing laterally when said link is hanging in a normal position and facing downwardly and receiving the lower end of said mounting element when said link is turned relative to said mounting element to a release position.

3. A cutter assembly as defined in claim 2 in which said lower end of said mounting element is disposed in the upper end of said loop when said link is in said normal position and is engageable with the upper portion of said attaching section to prevent detachment of said blade from said link, and said lower end of said mounting element being disposed in said pocket when said link is in said release position and being disposed out of the upper end of the loop to increase the effective distance between the upper and lower ends of the loop.

4. A cutter assembly as defined in claim 1 in which the distance between said one side edge of said blade and the opposite side edge is greater than the distance between the lower end of the said loop and the lower end of said mounting element when the lower end of the mounting element is disposed within the upper end portion of said loop, the distance between said side edges being greater than the distance between the upper and lower ends of the loop.

5. A cutter assembly as defined in claim 1 in which the upper edge of said blade is inclined downwardly from said one side edge toward the other side edge and coacts with said side edges to form protruding points at the upper corners of said attaching section, the distance between the closed end of said notch and at least one of said points being greater than the distance between the lower end of said loop and the lower end of said mounting element when the lower end of the mounting element is disposed in the upper end portion of said loop.

6. A cutter assembly as defined in claim 5 in which the distance between the closed end of said notch and said one point is less than the distance between the upper and lower ends of said loop.

7. A cutter assembly as defined in claim 5 in which the distance between the closed end of said notch and said one point is greater than the distance between the upper and lower ends of said loop.

8. In a cutter assembly for a flail-type mower having a power-driven rotor, the combination of, upper and lower chain-type links, said upper link being adapted for pivotal suspension from the rotor and being interlinked chain fashion with said lower link, said lower link being formed with an opening of predetermined length having a straight side and having an opposing bulged side defining a pocket, said lower link normally being positioned with said pocket facing laterally and with the lower end of said upper link disposed in the upper portion of said opening and reducing the length of the opening, said lower link being turnable within said upper link to a release position in which said pocket faces downwardly and deceives the lower end of said upper link, a blade having a sharpened cutting section and having a generally upright attached section disposed above said cutting section, a notched hook formed in said attaching section, said blade being attached to said lower link with the lower end of said lower link being received within said hook and with the upper portion of said attaching section normally being disposed within said opening and positioned to become wedged between the lower end of said upper link and the bulged side of said lower link to prevent turning of the lower link to the release position, said blade being movable to a position in which the upper portion of said attaching section is free of the lower end of said upper link thereby to leave said lower link free to turn to said release position, and means on said attaching section engageable with said upper link to prevent detachment of said blade until said lower link is turned to said release position.

9. A cutter assembly as defined in claim 8 in which the distance within said opening between said bulged side of said lower link and the adjacent side of said attaching section is less than the cross-sectional diameter of the material forming said upper link.

10. A cutter assembly as defined in claim 8 in which two of said blades are hooked onto said lower link.

11. A cutter assembly as defined in claim 8 in which the upper edge of said blade is normally disposed within said opening between said bulged side and the lower end of said upper link.

12. In a cutter assembly for a flail-type mower having a power-driven rotor, the combination of, upper and lower chain-type links, said upper link being adapted for pivotal suspension from the rotor and being interlinked chain fashion with said lower link, a blade having a sharpened cutting section and having a generally upright attaching section disposed above said cutting section, said attaching section being formed with a downwardly opening notch having walls hooked around the lower end of said lower link to hook said blade on the lower link, said attaching section having an upper end engageable with said upper link in one position of said blade to prevent unhooking of said blade from said lower link, and said upper end of said attaching section being movable to a position free from engagement with said upper link to permit unhooking of said blade from said lower link.

13. The combination of a power-driven rotor, a cutter assembly comprising upper and lower chain-type links, said upper link being suspended pivotally from said rotor and being interlinked chain fashion with said lower link, and a cutting blade formed with a downwardly opening hook and detachably hooked onto said lower link, said lower link being formed with an upright side and with an opposing side bulged outwardly away from and of greater length than said upright side.

14. The combination defined in claim 13 in which said upright side and said outwardly bulged side coact to define a substantially D-shaped opening in said lower link.

References Cited

UNITED STATES PATENTS 3,402,541   9/1968   Panck et al. _____ 56—294

ROBERT PESHOCK, Primary Examiner